United States Patent Office 3,121,109
Patented Feb. 11, 1964

3,121,109
ESTER INTERCHANGE OF ALIPHATIC DICARBOXYLIC ACID DIESTERS USING TITANIUM POLYMER CATALYSTS
David W. Young, Homewood, Ill., assignor, by mesne assignments, to Sinclair Research, Inc., New York, N.Y., a corporation of Delaware
No Drawing. Continuation of application Ser. No. 641,872, Feb. 25, 1957. This application Nov. 23, 1960, Ser. No. 71,133
6 Claims. (Cl. 260—485)

My invention relates to the preparation of esters which are useful, among other things, as synthetic lubricants and plasticizers. More particularly, this invention relates to the preparation of esters by an ester interchange reaction in which certain titanium-containing materials exhibit exceptional catalytic activity. These titanium-containing materials can be obtained from the reaction of titanium tetraesters and glycols.

Esters prepared from aliphatic dibasic acids and aliphatic alcohols have a variety of uses and frequently they have a sufficient viscosity to be useful as a synthetic lubricant base oil or additive component. It has been proposed that these esters be so employed but recently interest in this area has increased due to the use of turboprop and turbojet engines in military and commercial aircraft as the present requirements of these engines have made it advantageous or even necessary to employ synthetic lubricants rather than the less expensive mineral oil based compositions. One method of preparing these esters involves an ester interchange reaction and a number of catalysts have been suggested for use in this system. The present invention is based upon the finding that certain organic titanium-containing materials are effective catalysts for this ester interchange reaction.

The titanium-containing catalysts of this invention can be obtained by the reaction of a titanium tetraester with a glycol. These catalysts are either liquid or solid and are compatible; that is soluble, miscible or dispersible; with my ester and alcohol reactants, at least to the extent that a substantial catalytic effect will be produced. There is some question as to the structure of the titanium-containing catalysts and they may be derivable from materials other than the titanium tetraesters and glycols. However, due to difficulties and uncertainties in expressing the structures of these products, they are defined with reference to the titanium tetraester and glycol reactants.

The products I find useful are polymers, and, if desired, they can be water-washed to approach a water-insensitive form. At least certain of these polymers are chelated and have a coordinate valence bond between an oxygen and a titanium atom. Generally, the mere combination of a titanium tetraester and a glycol initiates an exothermic reaction, although if desired heating can be employed. The initial reaction may proceed only to the monomer stage or continue to a polymer product directly. If a monomer or partially polymerized product be first obtained it can be further polymerized. In any event, I can employ the various polymeric products afforded, including the partial polymers, which range from viscous liquids to solids and are compatible in my reaction system.

Among the titanium esters which can be employed for reaction with the glycol to produce the titanium-containing catalysts of this invention are alkyl titanates such as methyl, ethyl, propyl, butyl, 2-ethylhexyl, dodecyl, cyclohexyl and ethoxyethyl tetraesters; aryl tetraesters such as phenyl and beta-naphthyl tetratitanates; aralkyl esters such as benzyl tetratitanate, mixed esters including diethyl diphenyl tetratitanates, mixtures of these materials and their condensed or polymeric organic titanates. The various esters can be substituted in the hydrocarbon ester group although the unsubstituted esters are preferred. The esters prepared from monohydroxy alcohols are used most advantageously. Ordinarily, the separate organic radicals of the titanium tetraester will contain up to about 12 to 18 carbon atoms but may contain more if desired.

The preferred catalysts are the products obtained through the reaction of the titanium tetraester with a glycol of the 1,3-diol type, see U.S. Patent No. 2,643,262. As set forth in the patent, these glycols are 2,3-diorgano hydrocarbon substituted materials which have the formula

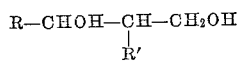

R—CHOH—CH—CH₂OH
       |
       R'

The diorgano radicals, that is the R and R' of the glycol formula, can be alkyl, aryl or mixed, and if desired be substituted as with halogen, for instance chlorine. Generally, these glycols contain from about 5 to 12 carbon atoms, however, if desired they could contain a greater number. Among the specific glycols which can be employed are 2-ethyl-1,3-hexanediol, 2-propyl-1,3-heptanediol, 2-methyl - 1,3 - pentanediol, 2 - butyl - 1,3 - butanediol, 2,4-diphenyl-1,3-butanediol, and 2,4-dimesityl-1,3-butanediol.

In addition to these glycols the catalysts can be prepared from others and generally the glycols will contain from 2 to 20 carbon atoms or more. Also, as indicated above, the glycols may be unsubstituted or substituted as with halogen or another hydroxy radical. Others of the glycols which can be used are ethylene glycol, 2,3-butanediol and ether polyalkylene glycols, for instance where the alkylene radical contains 2 to 4 carbon atoms such as diethylene glycol and dipropylene glycol.

I am not certain of the various structures of the products prepared from titanium tetraesters and glycols but those employed in this invention are polymeric in form. The configuration of these products has been considered in U.S. Patent 2,643,262 and in my patent application Serial No. 579,140, filed April 19, 1956, now abandoned, and I hereby incorporate the portions of that application which are pertinent to the possible structures obtained. It is preferred to employ the titanium ester-glycol reaction products which are relatively insensitive to water and these are obtained either by reacting the titanium tetraester with sufficient glycol to occupy all of the titanium valences, or by using a lesser amount of glycol and water washing the product so that any ester group of the original titanium tetraester remaining is replaced by a hydroxyl radical.

In spite of the uncertainties of the structures of the catalysts prepared from the titanium tetraesters and glycols, the compatible titanium compounds can be produced through reaction, with or without heating, of about ½ to 4 moles of glycol with each mole of titanium tetraester, preferably about 2 to 4 moles of glycol per mole of titanium tetraester. The first product obtained in the reaction, if it is a monomer or partial polymer, can be polymerized through heating or through water addition and heating with there being no particular critical limitation on either, except of course the temperature should not be so high as to decompose the desired reaction products. Ordinarily, the polymerization temperature will be above about 25° C. and preferably at least about 40° C. When employing heat to obtain a polymer in the absence of water and from a monomer dissolved in a solvent, it may be desirable to use a vacuum, say about 5 to 10 millimeters of mercury and a temperature of about 130 to 170° C. to remove the solvent while forming the polymer. Other conditions of temperature and pressure could be employed. Among the suitable inert solvents which can be employed are cyclohexane, n-butane, benzene, etc. If water be present during polymerization at least 1 part per part of titanium tetraester is usually employed with 2 to 20 parts of water being used most advantageously. At the end of the reaction, alcohol and water can be boiled off or otherwise removed. The length of time the heating is conducted can be varied widely and is not critical, and apparently during polymerization nonchelated groups of the titanium reactant are hydrolyzed from the molecule.

The following table describes several suitable titanium-containing materials prepared from the titanium tetraester and a glycol. These commercially available products can be polymerized to give my catalysts.

TABLE I

*Reactants*

| Octylene Glycol Titanates | Molar Proportions | | Solvent | Appearance |
|---|---|---|---|---|
| | Octylene Glycol [1] | Tetrabutyl Titanate | | |
| OGT-21 | 2 | 1 | 24% Butanol | Solid. |
| OGT-2.21 | 2.2 | 1 | 25% Butanol | Tacky Solid. |
| OGT-31 | 3 | 1 | 28% Butanol | Liquid. |
| OGT-41 | 4 | 1 | 31% Butanol | Do. |
| OGT-21 (washed) | 2 | 1 | 43% Cyclohexane. | Solid. |
| OGT-2.21 (washed) | 2.2 | 1 | 42% Cyclohexane. | Tacky Solid. |

[1] 2-ethyl-1,3-hexane diol.

Frequently the polymeric titanium catalyst will have a molecular weight from about 800 to 3000 and preferably from about 1000 to 1800 but the molecular weight may even be as high as 5000 to 10,000 or more. Advantageously, I employ the low molecular weight polymers. The low molecular weight OGT-derived polymers frequently have viscosities at 100° F. ranging from about 0.575 to 0.85 centistoke on the basis of 1 gram in 40 grams of toluene.

One reactant in my process is a diester of an aliphatic dibasic acid. These acids can be branched or straight chain and saturated or unsaturated and they contain from about 2 to 12 carbon atoms. The preferred acids are the saturated aliphatic dibasic acids which include, among others, succinic, adipic, diglycolic, suberic, azelaic, sebacic and "isosebacic" acids, which are mixtures of alpha-ethyl suberic acid, alpha-alpha'-diethyl adipic acid and sebacic acid. The esters of these acids which I find useful are those containing at least one ester group of a lower aliphatic alcohol and thus at least one, preferably two, of the alcohol groups of the ester contains up to about 4 carbon atoms. When one of the ester groups contains more than four carbon atoms, it can be derived from an alcohol such as the alcohol reactants described below. The use of the term "ester" refers to the diesters of these dibasic acids which diesters are my essential reactant. Suitable esters include methyl sebacate, ethyl adipate, propyl azelate, isopropyl succinate, butyl sebacate, methyl succinate, and similar diesters of the other dibasic acids.

My alcohol reactant is an aliphatic structure and contains at least 4 carbon atoms and generally not more than about 20 to 30. However, in cases where the alcohol is an ether alcohol, particularly an ether glycol, a greater number of carbon atoms may be present. In any event, the molecular weight of the alcohol is greater than that of the alcohol derived in the interchange system from the ester group of the dibasic acid ester reactant. The alcohols I can employ may be monohydric or polyhydric, for instance the dihydric glycols; and the other alcohols, such as glycol ethers, can also be employed. Mixtures of the various alcohols can be used and there can be reacted various of the alcohols in sequence. The preferred alcohols contain from 4 to 12 carbon atoms. The alcohols include, among others, butyl, hexyl, 2-ethylhexyl, dodecyl, cetyl and stearyl alcohols. The glycols and glycol ethers include ethylene glycol, propylene glycol, butylene glycol, triethylene glycol, diethylene glycol, ethylene glycol mono-2-ethyhexyl ether, diethylene glycol mono-n-butyl ether, propylene glycol mono-n-butyl ether, tripropylene glycol mono-ethyl ether, 2-ethyl-1,3-pentanediol, 2-ethyl-1,3-hexanediol, 2-isopropyl-1,3-hexanediol, etc. In general the useful glycols include the aliphatic monoglycols of 4 to 20 or 30 carbon atoms, preferably 4 to 12, and the polyglycols having from about 1 to 50 ether oxygen atoms obtained from monoglycols of 2 to 12 carbon atoms. Advantageously, the polyglycols contain from about 1 to 10 ether oxygen atoms and these can be of the formula $H(OC_xH_{2x})_nOH$ where $x$ is 2 to 4. The preferred polyglycols are the polyethylene and polypropylene glycols and those particularly useful have molecular weights from about 150 to 450.

The various complex esters can also be prepared in my reaction system and included among these are the products obtained by concurrent reaction of dibasic acid esters, glycols and monobasic acids and dibasic acid esters, glycols and monohydric alcohols. I can also prepare the half glycol ester of the dibasic acid ester and a glycol, and the half ester can be subsequently reacted as with a monobasic acid and a monohydric alcohol to form synthetic lubricants. Similarly useful products can be prepared by reacting a dibasic acid ester with the reaction product of a glycol and a monobasic aliphatic acid to obtain an ester exchange. Complex esters can also be prepared by reacting 1 mole of a monohydric alcohol with 1 mole of a dibasic acid ester to obtain a half ester exchange and then further exchange can be effected by reaction of 2 moles of the intermediate product with 1 mole of a glycol. Other ester exchange reactions are provided by mixing 1 mole of the dibasic acid ester with 2 moles of glycol and 2 moles of monobasic acid, and 2 moles of dibasic acid ester with 1 mole of glycol and 2 moles of monohydric alcohol. My titanium-containing catalyst can be used in any of these various systems where the essential reaction is an ester interchange between at least one ester group of a dibasic acid diester in which this ester group contains up to 4 carbon atoms with an alcohol containing at least 4 carbon atoms and at least one more carbon atom than the ester radical of the dibasic acid ester which is to be exchanged.

The reaction conditions I can employ are known in the art and can be generally described as ester interchange conditions. During this reaction the low molecular weight alcohol obtained from the ester radical of the dibasic acid ester is removed. Thus, during the reaction there is afforded from about 0.7 to 2 moles of such alcohol per mole of dibasic acid ester reactant. The amounts of alcohol and dibasic acid ester which are reacted in my system can vary from about 0.7 to 2 moles of alcohol per mole of ester, and particularly in preparing synthetic lubricants it is preferred that this ratio be at least about 1:1. When reacting glycols with the dibasic acid ester it is preferred to continue the reaction until the polyester product has a kinematic viscosity of about 15 to 200 centistokes at 210° F., preferably about 40 to 125 centistokes. The temperature of my reaction is sufficient to remove the alcohol formed by the ester interchange and is usually at least about 150° C. but not so high as to decompose the wanted product. Advantageously the temperature is in the range from about 200 to 275° C. The pressure I employ is conveniently about atmospheric although reduced pressures or superatmospheric pressures could be utilized. There is usually no necessity to use reduced temperatures as that required at atmospheric pressure to remove the alcohol formed does not unduly degrade the product if at all. Superatmospheric pressures might require the use of higher temperatures in removing the alcohol formed. The amount of catalyst I employ is sufficient to obtain a substantial catalytic effect and generally is in the range of about 0.01 to 5 weight percent of the alcohol and dibasic acid ester reactants with about 0.05 to 2 weight percent being preferred.

The following specific examples will serve to illustrate my invention, but they are not to be considered limiting. The first three examples are directed to the preparation of the titanium-containing catalyst.

EXAMPLE I

One part of OGT–41 was heated at 85° C. with 4 parts of water. The reaction was continued for about 100 minutes and under these conditions a white elastic titanium polymer was formed. The solid polymer was separated from the liquid phase and dried and the polymer analyzed:

| Component— | Weight percent |
|---|---|
| Titanium | 16.50 |
| Carbon | 50.85 |
| Hydrogen | 9.35 |
| Ash | 29.48 |

One gram of this polymer in 40 cc. of toluene had a viscosity at 100° F. of 0.5798 centistoke.

EXAMPLE II

One hundred grams of OGT–21 were placed in a 600 ml. Pyrex beaker. One hundred grams of water were added and these materials were agitated at 25° C. for 5 minutes. The water and alcohol were then removed from the solid white titanium polymer by filtration through a glass filter. The dried polymer analyzed:

| Component— | Weight percent |
|---|---|
| Titanium | 7.31 |
| Carbon | 54.34 |
| Hydrogen | 10.66 |
| Ash | 12.2 |

EXAMPLE III

One hundred grams of washed OGT–21 were combined with 100 grams of water and heated in a 600 ml. Pyrex beaker for about 2 hours at 80° C. Under these conditions a white titanium polymer slowly formed as an insoluble product. The product was filtered from the solvent through a glass filter and the dried polymer analyzed:

| Component— | Weight percent |
|---|---|
| Titanium | 13.1 |
| Carbon | 46.28 |
| Hydrogen | 9.41 |
| Ash | 21.9 |

To determine the effectiveness of these polymers as an ester interchange catalyst, 1 mole of methyl sebacate was reacted at 220° C. with 1 mole of polyethylene glycol (200 molecular weight) and the methyl alcohol was taken overhead as formed. The titanium polymer (2 grams) was added as a catalyst. The total time to obtain a 95% yield of polyester, viscosity of about 75 centistokes at 210° F., calculated on the amount of alcohol removed is recorded in the following table. Also listed in the table are the results obtained from known ester exchange catalysts in the same reaction under similar conditions.

TABLE NO. 1

| Run No. | Name of Catalyst | Amount Used, grams | Time in Hrs. to Obtain 95% Yield of Polyester |
|---|---|---|---|
| 1 | None | None | Infinite |
| 2 | Tetraisopropyl titanate | 2 | 9 |
| 3 | Dibutyl tin oxide | 2 | 12 |
| 4 | Di-N-butyl diphenyl tin | 2 | 12 |
| 5 | Tetracyclohexyl tin | 2 | 12 |
| 6 | Zinc stearate | 2 | 15 |
| 7 | Zinc polymer from bean acids as given in U.S. Patent 2,497,968. | 2 | 8 |
| 8 | Titanium polymer of Ex. I | 2 | 6 |
| 9 | Titanium polymer of Ex. II | 2 | 5 |
| 10 | Titanium polymer of Ex. III | 2 | 5 |

The effectiveness of my titanium polymer catalyst is apparent from the data of Table No. 1.

The polymer catalysts of Examples I to III were also employed in preparing other polyesters, viscosity of about 75 centistokes at 210° F., and esters by the ester interchange reaction employing the procedure used in obtaining the products of Table No. 1. The data pertinent to these reactions are in Table No. 2 which follows.

TABLE NO. 2

| Run No. | Name of Catalyst | Amt. of Catalyst, grams | Reactive Chemicals Charged | Time in Hrs. to Obtain 95% Yield of Product | Viscosity of Ester Product, cs. at 210° F. |
|---|---|---|---|---|---|
| 11 | Tetra isopropyl titanate | 2 | 1 mole of polypropylene glycol 425, 1 mole of methyl sebacate. | 14 | 75 |
| 12 | Di-butyl tin oxide | 2 | ...do... | 16 | 75 |
| 13 | Di-N-butyldiphenyl tin | 2 | ...do... | 19 | 75 |
| 14 | Zinc stearate | 2 | ...do... | 18 | 75 |
| 15 | Titanium polymer of Ex. II | 2 | ...do... | 11 | 75 |
| 16 | Titanium polymer of Ex. I | 2 | ...do... | 11 | 75 |
| 17 | ...do... | 2 | 2 moles of 2-ethyl hexanol, 1 mole of methyl sebacate. | 7 | 3.4 |
| 18 | ...do... | 2 | 2 moles of C$_8$ oxo alcohol, 1 mole of methyl sebacate. | 7 | 3.3 |
| 19 | Di-butyl tin oxide | 2 | 2 moles of 2-ethyl hexanol, 1 mole of methyl sebacate. | 13 | 3.4 |
| 20 | Zinc stearate | 2 | ...do... | 22 | 3.4 |

These data again illustrate the effectiveness of my catalyst in the ester interchange system.

This application is a continuation of Serial No. 641,872, filed February 25, 1957, now abandoned.

I claim:

1. In a method of preparing esters, the steps comprising reacting under ester interchange conditions a diester of an aliphatic dicarboxylic acid having an ester group derived from an alcohol of up to 4 carbon atoms, said acid having about 2 to 12 carbon atoms, with an aliphatic alcohol of 4 to about 20 carbon atoms containing at least one carbon atom more than the said ester group of the diester, while removing the alcohol formed in the reaction, and in the presence of about 0.01 to 5 weight percent, based on the alcohol and dicarboxylic acid ester reactants, of a catalyst which is a water-insensitive, water-insoluble polymer obtained by polymerizing, with water treating, the chelated reaction product of a titanium tetraester with a glycol of about 2 to 20 carbon atoms in the molar ratio of about 0.5 to 4 moles of glycol per mole of titanium tetraester.

2. In a method of preparing esters, the steps comprising reacting under ester interchange conditions a diester of an aliphatic dicarboxylic acid having an ester group derived from an alcohol of up to 4 carbon atoms, said acid having about 2 to 12 carbon atoms, with an ether glycol having about 1 to 10 ether oxygen atoms and containing 4 to about 20 carbon atoms and at least one carbon atom more than the said ester group of the diester, at a temperature of at least about 150° C., while removing the alcohol formed in the reaction, and in the presence of about 0.01 to 5 weight percent, based on the alcohol and dicarboxylic acid ester reactants, of a catalyst which is a water-insensitive, water-insoluble polymer obtained by polymerizing, with water treating, the chelated reaction product of a titanium tetraester with a glycol of about 2 to 20 carbon atoms in the molar ratio of about 2 to 4 moles of glycol per mole of titanium tetraester, and continuing the reaction until the ester product has a viscosity of about 15 to 200 centistokes at 210° F.

3. The method of claim 2 in which the ether glycol has a molecular weight of about 150 to 450 and is selected from the group consisting of polyethylene glycol and polypropylene glycol, and in which the reaction is continued until the ester product has a viscosity of about 40 to 125 centistokes at 210° F.

4. In a method of preparing esters, the steps comprising reacting under ester interchange conditions methyl sebacate and polypropylene glycol having a molecular weight from about 150 to 450 at a temperature of about 200 to 275° C., while removing the alcohol formed in the reaction and in the presence of about 0.01 to 5 weight percent, based on the alcohol and dicarboxylic acid ester reactants, of a catalyst which is a water-insensitive, water-insoluble polymer obtained by polymerizing, with water treating, the chelated reaction product of a titanium tetraester with a glycol of about 2 to 20 carbon atoms in the molar ratio of about 2 to 4 moles of glycol per mole of titanium tetraester, and continuing the reaction until the ester product has a viscosity of about 40 to 125 centistokes at 210° F.

5. In a method of preparing esters, the steps comprising reacting under ester interchange conditions methyl sebacate and 2-ethyl hexanol at a temperature of about 200 to 275° C., while removing the alcohol formed in the reaction and in the presence of about 0.01 to 5 weight percent, based on the alcohol and dicarboxylic acid ester reactants, of a catalyst which is a water-insensitive, water-insoluble polymer obtained by polymerizing, with water treating, the chelated reaction product of a titanium tetraester with a glycol of about 2 to 20 carbon atoms in the molar ratio of about 2 to 4 moles of glycol per mole of titanium tetraester.

6. The method of claim 1 where the chelated reaction product is polymerized in the presence of at least about 1 part, per part of the titanium tetraester, of water.

References Cited in the file of this patent

UNITED STATES PATENTS

| | | |
|---|---|---|
| 2,643,262 | Bostwick | June 23, 1953 |
| 2,701,261 | Perry et al. | Feb. 1, 1955 |
| 2,727,881 | Caldwell et al. | Dec. 20, 1955 |
| 2,795,553 | Lowe | June 11, 1957 |
| 2,822,348 | Haslam | Feb. 4, 1958 |